Figure 1:
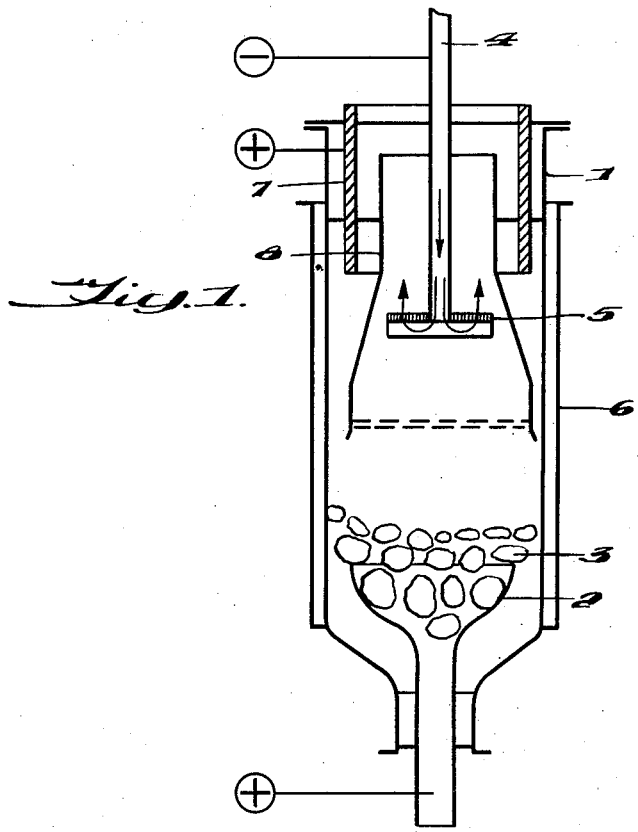

June 29, 1965   E. ENK ET AL   3,192,138
PROCESS FOR THE PRODUCTION OF HYDRIDES AND/OR HALOGENATED
HYDRIDES OF THE ELEMENTS BORON AND SILICON
Filed July 5, 1960

INVENTORS
EDUARD ENK,
JULIUS NICKL,

BY *Bailey, Stephens & Huettig*
ATTORNEYS

United States Patent Office 3,192,138
Patented June 29, 1965

3,192,138
PROCESS FOR THE PRODUCTION OF HYDRIDES AND/OR HALOGENATED HYDRIDES OF THE ELEMENTS BORON AND SILICON
Eduard Enk and Julius Nickl, Burghausen, Upper Bavaria, Germany, assignors to Wacker-Chemie G.m.b.H., Munich, Germany
Filed July 5, 1960, Ser. No. 40,871
Claims priority, application Germany, July 7, 1959, W 25,962
6 Claims. (Cl. 204—61)

The present invention relates to an improved process for the production of boron and silicon hydrides and/or halogenated hydrides.

A number of processes are known for the production of silane and halogenated silanes. For example, silicon hydride can be obtained from silicides and aqueous acids. The yields obtained, however, are very low and it was previously not possible to direct the reaction in a preferred direction so that, for example, only silico methane is produced.

According to a further but rather costly process silanes are produced from the corresponding halides by reduction with an ether solution of lithium aluminum hydride. This process and similar processes in which hydrides of the alkali metals and alkaline earth metals are employed for the hydrogenation do not permit the production of partially halogenated silanes, such as monobromosilane or dichlorosilane. The hydrogenation in all instances proceeds until the halogen free silane is produced.

It is furthermore known that silanes and halogenated silanes are produced when silicon halides are introduced together with hydrogen into an alkali metal halide-alkali metal hydride melt. In this instance the alkali metal hydride required may be produced at the same time by electrolysis of the alkali metal halide. Halogen free boranes may be produced in the same manner from boron halides.

In common to all of the known processes is the fact that they require use of compounds of silicon or boron and compounds of hydrogen (the latter as a hydrogenating agent) as starting materials. In no instance was it possible to produce silanes or boranes employing elemental silicon or boron and elemental hydrogen as starting materials.

According to the invention, it was found that hydrides and/or halogenated hydrides of silicon and boron could be produced using elemental hydrogen and elemental boron or silicon as starting materials by electrolysing fused halides of the first group of the periodic system or mixtures thereof in the presence of elemental hydrogen and using elemental boron or silicon as the anode. The cathode employed may also be elemental boron or silicon or any other conducting materials. Preferably the hydrogen is supplied to the face of the anode and/or cathode.

The electrodes or respectively the anodes can be of sintered, cast or granular boron or silicon. When granular material is used the conductors serving to supply the current can be filled, surrounded or covered with such granular material. It is of advantage to employ a 0.5–10 mm. grain size for such granular material. The anode material which is consumed must be replaced, preferably, continuously. The conductors serving to supply the current, preferably, are of graphite or electrode carbon. Instead of employing granular boron or silicon as the anode material, boron or silicon rods or otherwise shaped bodies can be used and be supplied continuously from the bottom or the side of the melt. The most favorable arrangement is obtained when the anode is provided below and the cathode located perpendicularly thereover.

Various materials can be used for the cathodes as long as they are conductive and are not altered or destroyed by the surrounding melt. Metals, such as iron, tantalum, titanium and nickel, metalloids, such as silicon, alloys, such as stainless steel and ingot steel, and carbides, such as silicon carbides, are especially suited as cathode materials.

It is of advantage if the cathode also can simultaneously serve for the introduction of the hydrogen. Preferably the hydrogen is introduced into the melt in finely divided form and is completely oxygen and water free. Good distribution of the hydrogen can, for example, be effected by its introduction through a porous sintered body. The distribution, however, also can be achieved with the aid of separate distributor tubes arranged about the cathode and/or anode. In order to attain usable yields it is necessary to introduce the hydrogen at the cathode and/or just above the anode. When the hydrogen passes through the melt in the form of large bubbles, the gases leaving the melt only contain small quantities of hydrogenated halides and considerably more silicon tetrachloride or boron trichloride. Furthermore, in such instance the deposit of finely divided silicon or boron may be observed at the cathode.

As an excess of hydrogen is always required for the production of the hydrides, it is advantageous to recycle the hydrogen after separating off a portion or all of the reaction products. Such separation is easily accomplished in a cooling trap. The reaction products may also be removed from the hydrogen before it is recycled by consumption in another process, for example, by thermal decomposition into silicon or boron and hydrogen.

The composition of the melt is most advantageously selected so that its melting point is as low as possible. Temperatures over 400° C. lower the yields of the hydrides, the other conditions being the same. Melts of alkali metal halides have proved particularly good. In order to decrease the melting point of such melts or to promote the hydride yield halides of elements of the second and third groups of the periodic system (Mendelejeff) may be added.

Trouble free operation can, for example, be achieved with salt mixtures of 50–60 mol percent of lithium chloride, about 30–40 mol percent potassium chloride, and about 10 mol percent of sodium chloride. A portion of the potassium and sodium chlorides can be replaced by halides of elements of the second or third groups of the periodic system. In such instance it is preferable to employ a lithium halide content of about 40 to 80 mol percent. However, other salt mixtures with halides of elements of the first to third groups of the periodic system can be employed as long as their melting point does not substantially exceed 400° C.

In larger electrolytic baths convection occurs in the melt whereby the melt flows from the anode to the cathode and then back again. Such convection causes a lack of uniformity in the composition of the end product of the process, that is, in various periods different quantities of hydrides or halides are produced. This can be avoided by providing a porous or perforated body such as a perforated sheet of titanium or an iron wire netting or the like transverse to the direction of the flow lines of the melt. The convection also can be prevented by employing a funnel shaped insert of the same material as the anode. These measures render it possible to obtain an end product of uniform composition.

The type of compounds produced depends upon the conditions under which the electrolysis is carried out as well as the quantity of hydrogen supplied. When only small quantities of hydrogen are supplied, mono-, di- and trihalogenated silanes or halogenated boranes are produced. When no hydrogen is supplied, water free halides are produced in part and fine crystalline silicon or boron is produced in part. However, the conditions of the electrolysis, such as, voltage, current density, temperature, pressure, composition of the fused salt bath, arrangement of the electrodes, are determinative of the direction the conversion takes. For example, it is not possible to produce silicon hydride or boron hydride or the halogenated derivatives thereof at voltages below 2 volts at atmospheric pressure.

The process can be carried out at atmospheric or superatmospheric pressures.

Figure 2:
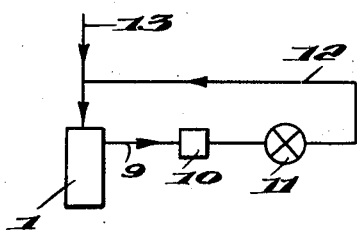

In the accompanying drawing:

FIG. 1 diagrammatically shows an apparatus for carrying out the process according to the invention; and FIG. 2 schematically shows an arrangement for such apparatus when the hydrogen is recycled.

With reference to FIG. 1, the electrolytic cell consists of an upright quartz glass tube 1 about 50 mm. in diameter. A siliconized dish shaped graphite anode 2 filled with silicon granules 3 of 1–5 mm. grain size is provided in the lower portion of such tube. Iron tube 4 which is introduced into the top of tube 1 serves as the cathode. A distributor plate 5 of porous sintered titanium is provided at the bottom end of cathode tube 4 to distribute hydrogen introduced through tube 4 in finely divided state into the fused salt bath employed as electrolyte. A funnel shaped insert 8 is provided to prevent convection in the electrolyte. A radiant heater 6 is provided to maintain the necessary salt bath temperature of about 350° C. An auxiliary anode 7 of graphite or electrode carbon is provided at about the same height as the cathode. This auxiliary anode can be used at the beginning of the electrolysis if desired to prevent initial production of halogenated silanes or boranes.

In FIG. 2, the quartz tube 1 of the electrolytic cell is supplied with fresh hydrogen over conduit 13. The reaction mixture together with the unconsumed hydrogen leaves the electrolytic cell over conduit 9. The hydride or halogenated hydrides are removed from the unconsumed hydrogen in 10, for example, by cooling and condensing or by conversion to other products. The remaining hydrogen is recycled to conduit 9 over blower 11 and conduit 12.

The following examples will serve to illustrate several embodiments of the process according to the invention:

*Example 1*

An apparatus as shown in FIG. 1 containing an electrolyte composed of 5 mol percent of sodium bromide, 40 mol percent of potassium chloride and about 55 mol percent of lithium chloride was used. The electrolysis was carried out at a voltage of about 6–10 volts while introducing a finely divided hydrogen into the fused electrolyte which was maintained at about 350° C. During the first few minutes of the electrolysis the gas stream leaving the electrolyte contained silicon tetrachloride, silicon chloroform and dichlorosilane. After about 30 minutes' electrolysis the formation of silicon hydride ($SiH_4$) began in ever increasing quantities. After about 50 minutes' electrolysis the gas stream leaving the electrolyte practically only contained silicon hydride and unconsumed hydrogen.

The silicon which was consumed during the electrolysis was replenishd and it was possible thereby to produce silicon hydride in a continuous stream. When the silicon granules were replaced by boron granules, the unconsumed hydrogen leaving the electrolyte chiefly contained diborane and its homologues as well as traces of chlorinated boranes.

The formation of halogen containing silanes or boranes during the beginning stages of the electrolysis could be prevented by beginning such electrolysis with the graphite or electrode carbon auxiliary anode 7 shown in FIG. 1. After about 30 minutes' operation with the auxiliary anode the current was then switched to the actual operating anode 2. The hydrogen leaving the electrolyte thereafter, in addition to silicon hydride, only contained traces of halogenated silanes.

*Example 2*

A water free salt mixture consisting of 20% by weight of lithium chloride, 30% by weight of sodium chloride, 40% by weight of potassium chloride and 10% by weight of calcium chloride was introduced into an iron electrolytic cell similar to that of FIG. 1 in which the lower graphite electrode is separated from the walls of the iron vessel by asbestos insulation. The graphite electrode was filled with coarse pieced crystalline boron and covered with a perforated graphite lid to prevent the boron from floating off during electrolysis. The cathode was the same as that of the apparatus of FIG. 1. The cell was heated externally to fuse the salt mixture while the lower end of the iron vessel, which was in the shape of a tube, surrounding the lead-in for the graphite anode was water cooled so as to form a plug of solidified salt mixture to close off such lower end. After the salt mixture fused the electrolysis was carried out at ½ atmosphere gauge pressure, a voltage of 7–11 volts and a sufficiently high current strength that external heating of the salt melt was no longer necessary. However, an anode current density over 3800 A./m.$^2$ should not be exceeded. The iron vessel was insulated externally and was protected during the electrolysis by an interior coating of solidified melt. In order to start the electrolysis and begin the formation of boron trichloride at the anode, it was found advantageous to add a trace of sodium fluoride to the melt. However, in view of the strongly corrosive character of the latter the quantity of this salt added must be as small as possible. At the beginning of the electrolysis the gas leaving the fused electrolyte only contained hydrogen. During the progress of the electrolysis boron trichloride is formed together with boron hydrides, later $B_5H_9$ is produced as the principal product.

We claim:

1. A process for the production of a hydrogen containing compound of an element selected from the group consisting of silicon and boron which comprises passing a current between an anode selected from the group consisting of elemental boron and silicon anodes and a cathod through a fused salt bath having a melting point of up to 400° C. containing alkali metal halides and supplying hydrogen to the face of at least one of the electrodes during the passage of such current.

2. The process of claim 1 in which the cathode is located above the anode in said fused salt bath and fine hydrogen bubbles are supplied to the face of the cathode while the current is passed between the anode and the cathode.

3. The process of claim 2 in which the current employed is one of at least 2 volts.

4. The process of claim 1 in which said fused salt bath also contains at least alkaline earth metal halide.

5. The process of claim 1 in which the elemental material of said anode is in granular form.

6. The process of claim 1 in which the elemental material of such anode consumed is replaced continuously.

References Cited by the Examiner

UNITED STATES PATENTS

| | | | |
|---|---|---|---|
| 2,596,690 | 5/52 | Hurd | 204—61 |
| 2,635,993 | 4/53 | Snavely | 204—59 |
| 2,867,568 | 1/59 | Cunningham | 204—61 |
| 3,033,766 | 5/62 | Schechter | 204—61 |
| 3,078,218 | 2/63 | Sundermeyer | 204—61 |

FOREIGN PATENTS 470,679    6/51    Canada.

WINSTON A. DOUGLAS, *Primary Examiner.*

JOHN R. SPECK, MURRAY TILLMAN, JOHN H. MACK, *Examiners.*